US00RE39700E

(19) United States
(12) Reissued Patent
Halko

(10) Patent Number: US RE39,700 E
(45) Date of Reissued Patent: Jun. 26, 2007

(54) INK ADDITIVES FOR IMPROVED INK-JET PERFORMANCE

(75) Inventor: David J. Halko, Corvallis, OR (US)

(73) Assignee: Hewlett-Packard Company, Palo Alto, CA (US)

(21) Appl. No.: 11/258,587

(22) Filed: Oct. 26, 2005

Related U.S. Patent Documents

Reissue of:
(64) Patent No.: 5,062,892
Issued: Nov. 5, 1991
Appl. No.: 07/428,282
Filed: Oct. 27, 1989

(51) Int. Cl.
*C09D 11/02* (2006.01)

(52) U.S. Cl. ..... 106/31.43; 106/31.49; 106/31.58

(58) Field of Classification Search ..... 106/31.27, 106/31.43, 31.49, 31.58
See application file for complete search history.

(56) References Cited

U.S. PATENT DOCUMENTS

| | | | |
|---|---|---|---|
| 3,853,913 | A | 12/1974 | Brack et al. |
| 4,239,543 | A | 12/1980 | Beasley |
| 4,285,727 | A | 8/1981 | Uehara et al. |
| 4,286,989 | A | 9/1981 | Kadehjian et al. |
| 4,299,630 | A | 11/1981 | Hwang |
| 4,373,954 | A | 2/1983 | Eida et al. |
| 4,592,756 | A | 6/1986 | Kawasaki et al. |
| 4,685,968 | A | 8/1987 | Palmer |
| 4,724,001 | A | 2/1988 | Ohta et al. |
| 4,786,288 | A | 11/1988 | Handa et al. |
| 4,810,292 | A | 3/1989 | Palmer et al. |
| 4,853,037 | A | 8/1989 | Johnson et al. |
| 4,935,059 | A | 6/1990 | Mayer et al. |
| 4,975,118 | A | 12/1990 | Mayer et al. |

FOREIGN PATENT DOCUMENTS

| | | |
|---|---|---|
| JP | 57-036170 | 2/1982 |
| JP | 59-051960 | 3/1984 |

OTHER PUBLICATIONS

European Search Report for EP 90 31 1216 (corresponding to U.S. 5,062,892).

Gendler, P.L., et al., "Adverse Chemical Effects on the Plasma–Deposited Amorphous Carbide Passivation Layer of Thermal Ink–Jet Thin–Film Heaters," *Advance Printing of Paper Summaries*, Nov. 12–17, 1989, pp. 287–290, San Diego, California.

Halko, D. J., *Adsorption from Solution at the Solid/Liquid Interface*, G.D. Parfitt and C.H. Rochester, eds, p. 358–359, Academic Press, 1983.

*Primary Examiner*—Helene Klemanski
(74) *Attorney, Agent, or Firm*—Foley & Lardner LLP

(57) ABSTRACT

Oxo anions (both singly and multiply charged), such as phosphates, polyphosphates, and phosphate esters, serve as additives, and in the case of cationic dyes, may serve as replacement counter-ions, for use in thermal ink-jet inks to reduce kogation significantly. The addition of such additive essentially eliminates kogation for the life of ink pens. Further, such additives will prevent kogation for inks containing dyes with negatively-charged water-solubilizing groups, such as sulfonate and carboxylate.

19 Claims, 1 Drawing Sheet

INK ADDITIVES FOR IMPROVED INK-JET PERFORMANCE

Matter enclosed in heavy brackets [ ] appears in the original patent but forms no part of this reissue specification; matter printed in italics indicates the additions made by reissue.

TECHNICAL FIELD

The present invention relates to inks used in ink-jet printers, and, more particularly, to an ink used in thermal ink-jet printers having improved kogation properties.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

A problem with inks used in such thermal ink-jet printers is that the repeated heating of the resistor element over several hundreds of thousand or over millions of firings can cause breakdown of the ink, with consequent fouling of the surface of the resistor element. This process has been termed "kogation", which is defined as the build-up of residue (koga) on the resistor surface. The build-up of residue degrades pen performance.

Various ink compositions and processes have been developed in an effort to reduce kogation. For example, in the anionic dyes (sulfonate or carboxylate) commonly employed in aqueous inks used in thermal ink-jet printing, sodium is generally the counter-ion used. However, while dyes containing sodium counter-ions generally provide good print quality, sodium counter-ions have been found to contribute to the kogation problem.

One solution has been to partially or totally eliminate sodium. Successful replacement counter-ions are lithium and tetramethylammonium.

The need remains for the development of inks having reduced kogation, and hence longer life, using low cost chemicals with minimal additional processing.

DISCLOSURE OF INVENTION

In accordance with the invention, oxo anions serve as additives, and in the case of cationic dyes, may serve as replacement counter-ions, for use in thermal ink-jet inks to reduce kogation significantly. The oxo anions of the invention may be singly or multiply charged.

The addition of such additive essentially eliminates kogation for the life of ink pens, such as those used in Hewlett-Packard's DeskJet printer. Further, such additives will prevent kogation for inks containing dyes with negatively-charged water-solubilizing groups, such as sulfonate and carboxylate.

BEST MODES FOR CARRYING OUT THE INVENTION

Inks benefitted by the practice of the invention comprise a vehicle and a dye. The vehicle typically comprises one or more water-miscible organic compounds, such as a glycol or glycol ether and water. The dye may be any of the anionic or cationic dyes. The dye is typically present in an amount ranging from about 1 to 12% (by weight), although more or less dye may be used, depending on the vehicle/dye system, the desired optical density, etc. Typically, the dye concentration is about 2 to 6% (by weight). All amounts herein are by weight, unless otherwise indicated.

Particularly employed as inks herein are ICI dyes 286 and 287, preferably in a 50—50 mixture. However, any of the well-known dyes may alternately be used.

The particular water-miscible organic compounds and their concentration does not form a part of this invention. However, examples of such compounds include glycols such as ethylene glycol, diethylene glycol, propylene glycol, polyethylene glycol, etc., and pyrrolidones, such as 2-pyrrolidone. Usually, the glycol is present in an amount up to about 50%, and more typically up to about 10%, with the balance water. The pyrrolidine is usually present in an amount of about 7 to 10%, with the balance water.

Other additives may be added to the ink, such as fungicides, bactericides, pH adjusters, and the like, as is well-known. Such additives, and the materials comprising the vehicle and dye are of a purity commonly found in normal commercial practice.

In accordance with the invention, the addition of a compound containing an oxo anion significantly reduces kogation, and may even eliminate it entirely. Examples of such oxo anions include phosphates (both $PO_4^{3-}$ and $P_2O_7^{4-}$) and phosphate esters (both mono-organo, $ROPO_3^{2-}$, and di-organo, $(RO)_2PO_2^-$). For the phosphate esters, R is an alkyl or aromatic group. The R groups for the di-organo phosphates may be the same or different. The organic R group can also be substituted with various functional groups.) Further examples of oxo anions beneficially employed in the practice of the invention include, in descending order of preference, arsenate ($AsO_4^{3-}$), molybdate ($Mo_7O_{24}^{6-}$), sulfate ($SO_4^{2-}$), sulfite ($SO_3^{2-}$), and oxalate ($C_2O_4^{2-}$). Anions other than these may not have a beneficial effect. For example, nitrate and thiocyanate anions are ineffective with the ICI dyes mentioned above. As used herein, an oxo anion is a class of anions in which various elements are bound to oxygen and which bear an overall negative charge in aqueous solution.

The most effective additive to date are phosphate salts; added either as dibasic ($HPO_4^{2-}$) monobasic ($H_2PO_4^-$), polyphosphates such as diphosphate ($P_2O_7^{4-}$), or phosphate esters.

The phosphate species in solution is determined by the pH of the ink. In the pH range of 8 to 9 (typical for inks containing ICI dyes), the predominate species for both mono and dibasic phosphate is $HPO_4^{2-}$.

Figure 1:
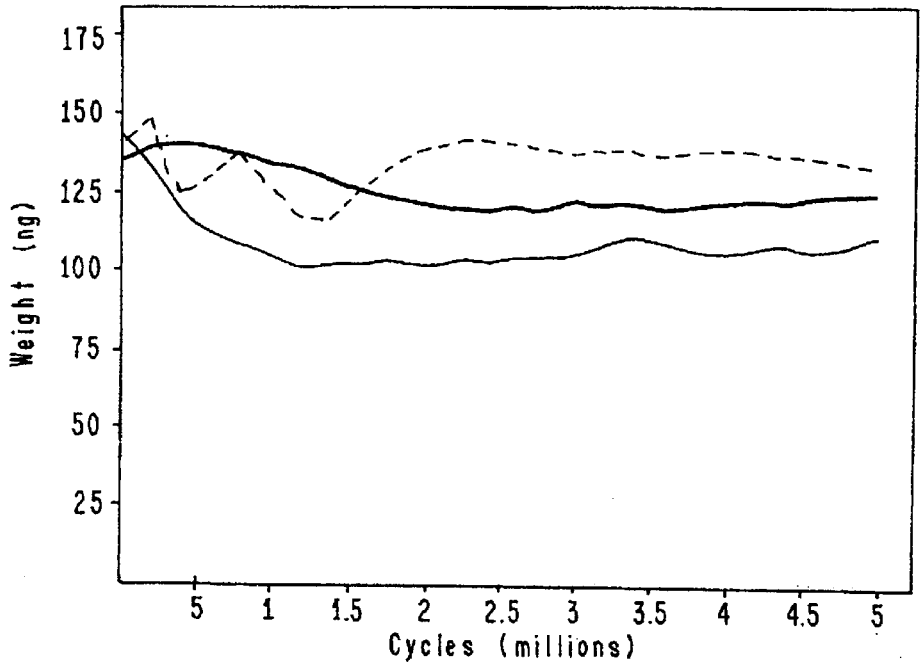
Fig. 1. (Prior art)
FIG. 1, on coordinates of weight (in nanograms, ng) and number of cycles (resistor firings), is a plot of drop weight versus cycles for three different energies of an ink not including the additive of the invention, depicting the effect of kogation on drop weight out to 5 million cycles.

FIG. 1 depicts a measure of kogation from an ink comprising a vehicle of 10% 2-pyrrolidone and 0.2% sodium borate, the balance water, and 2.2% of a 50—50 mixture of ICI 286/287 dyes ($NH_4^+$ form). The pH was adjusted to 8.5 with $NH_4OH$. In this ink, no additive was used, and it is clear that there is a large decrease in drop volume (determination is by weight) with this ink, beginning almost immediately.

Figure 2:
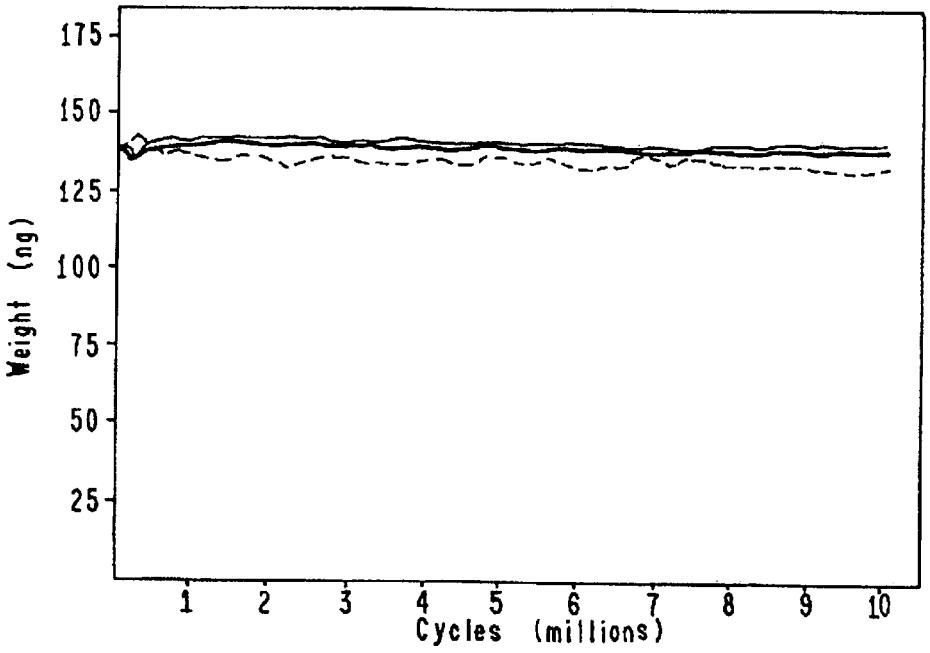
FIG. 2 is a plot similar to that of FIG. 1, but for an ink containing the additive of the invention, depicting essentially no kogation out to 10 million cycles.

For comparison, kogation results for the same base ink composition with 0.1 wt% ammonium phosphate are depicted in FIG. 2. The addition of ammonium phosphate clearly yields an ink with constant drop volume. This ink evidence substantially flat behavior even out to 30 million cycles.

The selection of the counter-ion is not critical, other than it not adversely interfere with the reduction in kogation. Examples of suitable cations include alkali metals, ammonium, and alkyl ammonium. An especially efficacious compound is ammonium phosphate. Phosphate ion can also be added as phosphoric acid ($H_3PO_4$), along with neutralization with an appropriate base.

The concentration of the kogatin-reducing additive (anions) of the invention ranges from about 9 mg/L to 14 wt%, based on the oxo anion. Less than about 9 mg/L, while effective, is not enough to yield stable drop volumes out to several million firings. Greater than about 14 wt% provides no further benefit. Preferably, the concentration of the oxo anion ranges from about 0.01 to 1 wt%.

As indicated earlier, kogation degrades pen performance. A decrease in pen performance can be monitored by measuring (weighing) drops fired from a pen. A change in drop volume indicates the formation of resistor residues.

Without subscribing to any particular theory, it appears that the kogation effect is due to adsorption of dye and/or decomposition products of ink on the resistor surface. The appearance and increase in adsorbed dye or decomposition products apparently reduces the volume of ink fired. The additive of the invention is believed to eliminate or reduce the adsorption process.

The addition of ammonium phosphate to inks at relatively low concentrations (0.02 to 0.5%) yields inks which have constant drop volumes out to many million drops. For example, inks containing such amounts of ammonium phosphate have shown that ink volumes remain constant to at least 30 million drops. The same inks without ammonium phosphate do not have constant drop volumes, as indicated earlier with reference to FIGS. 1 and 2.

Examination of the resistors from inks without and with the addition of ammonium phosphate shows that there is a large amount of residue (koga) on resistors for inks without phosphate fired only to 5 million cycles and essentially clean resistor surfaces for inks containing phosphate when fired twice that number of cycles (10 million).

Auger Electron Spectroscopy has determined that the resistor residue primarily comprises carbon. Other elements, such as nitrogen, oxygen, and sulfur are at relatively lower concentrations. The resistor surfaces exposed to non-phosphate containing inks have a thick carbon layer (corresponding to adsorbed dye and/or ink decomposition products), whereas the resistor surfaces exposed to phosphate-containing inks have only a very thin carbon layer, together with some phosphorus. Apparently, phosphate is being adsorbed on the resistor surface, and prevents the adsorption of dye and/or ink decomposition products thereon.

Interestingly, the foregoing suggests that the process of kogation is reversible. Indeed, pens have been kogated by firing with an ink that does not contain phosphate to several million cycles until the drop volumes decrease considerably. Refilling these pens with a phosphate-containing ink yields complete recovery of the pen. That is, the drop volumes rise to a "normal level" of about 140 pL.

The pH of the inks is adjusted to be within the range of about 3 to 10, and preferably about 8 to 9 for the ICI dye examples discussed herein, using commonly-employed pH adjusters.

INDUSTRIAL APPLICABILITY

The oxo anion additive of the invention is expected to find use in inks used in thermal ink-jet printers.

EXAMPLES

Example 1

In this example, the preparation of an ink containing phosphate is described.

The ink comprised a vehicle of 10% 2-pyrrolidone, 0.2% sodium borate as a pH buffer, and the balance deionized water and 2.2% of 50—50 ICI 287/287 dye. Monobasic ammonium phosphate ($NH_4H_2PO_4$) was added to the foregoing ink to provide a concentration of 0.1 wt% therein. The initial pH was adjusted to 8.5 with concentrated $NH_4OH$.

Example 2

The ink from Example 1 was tested for kogation out to 10 million cycles. The parameter which has been used to evaluate the effectiveness of an additive is drop volume. In this test, droplets ejected from a pen are collected and weighed in a pan on an analytical balance. An average weight is obtained and is commonly referred to as drop volume in picoliters (pL). The current test operates at three different energies (15%, 30%, and 45%) over (OE) that required to fire a droplet from a nozzle in order to obtain a range of performance. In a given printer and a given pen under normal operating conditions, a pen will be operating at a single energy.

The results are depicted in FIG. 2, as discussed above. In FIG. 2 (and in FIG. 1), the dashed line represents 15% OE, the heavy solid line represents 30% OE, and the light solid line represents 45% OE.

Example 3

For comparison, the same ink as in Example 1 was prepared, but omitting the ammonium phosphate. The ink was tested as in Example 2. The results are depicted in FIG. 1, as discussed above.

Clearly, the ink without ammonium phosphate is seen to exhibit kogation within a very short number of cycles, while the ink containing ammonium phosphate is stable against kogation out to at least 10 million cycles.

Example 4

A mixture of dimethyl phosphate (55%) and monomethyl phosphate (45%) was added to an ink which was the same as in Example 3, except that the amount of pyrrolidone in the vehicle was 7.5%. The total phosphate ester concentration was 0.5 wt% and the pH of the ink was adjusted to 8.5. This ink had stable drop volumes when tested to 4.8 million cycles.

Example 5

Addition of 0.2% ammonium phosphate to an ink prepared with the sodium form of Direct Black 168 (1.9 wt%) in a vehicle of 5.5% diethylene glycol, balance water, yielded excellent results. The drop volumes were constant when tested to 9 million cycles.

Example 6

Addition of 0.5% of a mixture of dimethyl phosphate (55%) and monomethyl phosphate (45%) to an ink prepared with the lithium form of Acid Red 27 (3 wt%), a magenta dye, in a vehicle of 5.5 wt% diethylene glycol, balance water, yielded stable drop volumes for all energies when tested to 4.8 million cycles.

Example 7

Addition of 0.2% ammonium phosphate to an ink prepared with Acid Red 27 (3 wt%) in a vehicle of 5.5 wt% diethylene glycol, balance water, yielded stable drop volumes for all energies for all energies (15%, 30%, 45% OE) after an initial rise, which converged at approximately 160 pL. Each OE curve rose at a different rate and was stable after 0.4 million for 45% OE, 1.4 million for 30% OE, and approximately 3 million for 15% OE. This demonstrates that after some initial "break-in period", phosphate stabilized the drop volumes at a high level, giving excellent results.

Thus, there has been disclosed an additive for reduction or eliminating kogation in inks used in thermal ink-jet printers. It will be readily apparent to those skilled in this art that various changes and modifications of an obvious nature may be made, and all such changes and modifications are considered to fall within the scope of the invention as defined by the appended claims.

What is claimed is:

1. An ink for thermal ink-jet printing comprising a vehicle and an anionic dye, characterized by the presence of at least one oxo anion therein, said at least one oxo anion selected from the group consisting of phosphates, polyphosphates, phosphate esters, arsenate, molybdate, sulfate, sulfite, and oxalate and present in an amount ranging from about 9 mg/L to 14 wt%,

*wherein said ink further comprises ammonium* ($NH_4^+$) *cations, and*

*wherein said at least one oxo anion is selected from monobasic phosphate* ($H_2PO_4^-$), *dibasic phosphate* ($HPO_4^{2-}$), *or diphosphate* ($P_2O_7^{4-}$) *anions or combinations thereof.*

2. The ink of claim 1 wherein said vehicle comprises at least one glycol and the balance water.

3. The ink of claim 2 wherein said vehicle comprises up to about 10 wt% diethylene glycol and the balance water.

4. The ink of claim 1 wherein said vehicle comprises at least one pyrrolidone and the balance water.

5. The ink of claim 4 wherein said vehicle comprises up to about 10 wt% 2-pyrrolidone and the balance water.

6. The ink of claim 1 comprising about 1 to 12 wt% of said dye.

[7. The ink of claim 1 wherein said phosphate is in the form of dibasic, monobasic, or diphosphate anions.]

[8. The ink of claim 1 wherein said phosphate ester is selected from the group consisting of mono-organo and di-organo phosphate esters.]

9. The ink of claim 1 wherein said at least one oxo anion is present in an amount ranging from about 0.01 to 1 wt%.

10. An ink for thermal ink-jet printing comprising a vehicle and an anionic dye, characterized by the presence of anions selected from the group consisting of phosphates, polyphosphates, and phosphate esters, said anions present in an amount ranging from about 9 mg/L to 14 wt%,

*wherein said ink further comprises ammonium* ($NH_4^+$) *cations,*

*wherein said anions are selected from monobasic phosphate* ($H_2PO_4^-$), *dibasic phosphate* ($HPO_4^{2-}$), *or diphosphate* ($P_2O_7^{4-}$) *anions or combinations thereof, and*

*wherein the ink provides substantially constant drop volume through 5 million resistor firings.*

11. The ink of claim 10 wherein said vehicle comprises at least one glycol and the balance water.

12. The ink of claim 11 wherein said vehicle comprises up to about 10 wt% diethylene glycol and the balance water.

13. The ink of claim 10 wherein said vehicle comprises at least one pyrrolidone and the balance water.

14. The ink of claim 13 wherein said vehicle comprises up to about 10 wt% 2-pyrrolidone and the balance water.

15. The ink of claim 10 comprising about 1 to 12 wt% of said dye.

[16. The ink of claim 18 wherein said phosphate anion is in the form of dibasic, monobasic, or diphosphate anions.]

[17. The ink of claim 10 wherein said phosphate ester is selected from the group consisting of mono-organo and di-organo phosphate esters.]

18. The ink of claim 12 wherein said phosphate anion is present in an amount ranging from about 0.01 to 1 wt%.

19. A method of reducing kogation in an ink used in thermal ink-jet printers, said ink comprising a vehicle and an anionic dye, characterized in that at least one salt containing at least one oxo anion is added thereto, said at least one oxo anion selected from the group consisting of phosphates, polyphosphates, phosphate esters, arsenate, molybdate, sulfate, sulfite, and oxalate and present in an amount ranging from about 9 mg/L to 14 wt%,

*wherein said ink further comprises ammonium* ($NH_4^+$) *cations, and*

*wherein said at least one oxo anion is selected from monobasic phosphate* ($H_2PO_4^-$), *dibasic phosphate* ($HPO_4^{2-}$), *or diphosphate* ($P_2O_7^{4-}$) *anions or combinations thereof.*

20. The method of claim 19 wherein said at least one oxo anion is added in an amount of 0.01 to 1 wt%.

[21. The method of claim 19 wherein said phosphate is in the form of dibasic, monobasic, or diphosphate anions.]

[22. The method of claim 19 wherein said phosphate ester is selected from the group consisting of mono-organic and di-organic phosphate esters.]

23. A method of reducing kogation in an ink used in thermal ink-jet printers, said ink comprising a vehicle and an anionic dye, characterized in that from about 9 mg/L to 14 wt% of a salt containing an anion selected from the group consisting of phosphate, polyphosphates, and phosphate esters is added thereto,

*wherein said ink further comprises ammonium* ($NH_4^+$) *cations, and*

*wherein said anion is selected from monobasic phosphate* ($H_2PO_4^-$), *dibasic phosphate* ($HPO_4^{2-}$), *or diphosphate* ($P_2O_7^{4-}$) *anions or combinations thereof, and*

*wherein the ink provides substantially constant drop volume through 5 million resistor firings.*

24. The method of claim 23 wherein said phosphate is in the form of dibasic, monobasic, or diphosphate anions.

[25. The method of claim 23 wherein said phosphate is in the form of dibasic, monobasic, or diphosphate anions.]

[26. The method of claim 23 wherein said phosphate ester is selected from the group consisting of mono-organic and di-organic diphosphate esters.]

*27. An ink for thermal ink-jet printing comprising a vehicle and an anionic dye, characterized by the presence of at least one oxo anion therein, said at least one oxo anion selected from the group consisting of phosphates, polyphosphates, phosphate esters, arsenate, molybdate, sulfate, sulfite, and oxalate and present in an amount ranging from about 9 mg/L to 14 wt%, wherein said ink further comprises ammonium* ($NH_4^+$) *cations.*

* * * * *